US011200497B1

(12) United States Patent
Yan et al.

(10) Patent No.: US 11,200,497 B1
(45) Date of Patent: Dec. 14, 2021

(54) SYSTEM AND METHOD FOR KNOWLEDGE-PRESERVING NEURAL NETWORK PRUNING

(71) Applicant: MOFFETT TECHNOLOGIES CO., LIMITED, Central (HK)

(72) Inventors: Enxu Yan, Los Altos, CA (US); Dongkuan Xu, University Park, PA (US); Zhibin Xiao, Los Altos, CA (US)

(73) Assignee: MOFFETT TECHNOLOGIES CO., LIMITED, Central (HK)

( * ) Notice: Subject to any disclaimer, the term of this patent is extended or adjusted under 35 U.S.C. 154(b) by 0 days.

(21) Appl. No.: 17/203,020

(22) Filed: Mar. 16, 2021

(51) Int. Cl.
*G06N 3/08* (2006.01)
*G06N 3/04* (2006.01)

(52) U.S. Cl.
CPC ............ *G06N 3/082* (2013.01); *G06N 3/0454* (2013.01)

(58) Field of Classification Search
CPC ......... G06N 3/082; G06N 3/04; G06N 3/0454
See application file for complete search history.

(56) References Cited

U.S. PATENT DOCUMENTS

| | | | | |
|---|---|---|---|---|
| 2019/0325308 | A1* | 10/2019 | Chung | G06F 40/44 |
| 2020/0104717 | A1* | 4/2020 | Alistarh | G06N 3/082 |
| 2020/0334520 | A1* | 10/2020 | Chen | G06N 3/088 |

OTHER PUBLICATIONS

Park, Mi Sun et al.; SQuantizer: Simultaneous Learning for Both Sparse and Low-precision Neural Networks; arXiv:1812.08301v2 [cs.CV] Mar. 23, 2019; pp. 1-10. (Year: 2019).*
Park, Seong Uk et al.; On the Orthogonality of Knowledge Distillation with Other Techniques: From an Ensemble Perspective; Graduate School of Convergence Science and Technology Seoul National University; 11 pages. (Year: 2020).*
Blalock, Davis et al.; What is the State of Neural Network Pruning?; Proceedings of the 3rd MLSys Conference 2020; 18 pages. (Year: 2020).*
Kulkarni, Akshay et al.; Data Efficient Stagewise Knowledge Distillation; arXiv:1911.06786v3 [cs.LG] Jun. 23, 2020; pp. 1-15. (Year: 2020).*
Chen et al., "The Lottery Ticket Hypothesis for Pre-Trained BERT Networks", arXiv, NeurIPS, 33, Oct. 2020, 19 pages.
Devlin et al., "BERT: Pre-training of Deep Bidirectional Transformers for Language Understanding", arXiv, NAACL, May 2019, pp. 4171-4186.

(Continued)

*Primary Examiner* — Stanley K. Hill

(57) ABSTRACT

Methods, systems, and apparatus, including computer programs encoded on computer storage media, for knowledge-preserving sparse pruning on neural networks are described. An exemplary method includes obtaining a pre-trained machine learning model trained based on a plurality of general-purpose training data; training a task-specific machine learning model by tuning the pre-trained machine learning model based on a plurality of task-specific training data corresponding to a task; constructing a student network based on the task-specific machine learning model; simultaneously performing (1) knowledge distillation from the trained task-specific machine learning model as a teacher network to the student network and (2) network pruning on the student network; and obtaining the trained student network for serving the task.

20 Claims, 7 Drawing Sheets

(56) References Cited

OTHER PUBLICATIONS

Elsen et al., "Fast Sparse ConvNets", CVPR, IEEE Xplore, 2020, pp. 14629-14638.
Fan et al., "Reducing Transformer Depth on Demand with Structured Dropout", arXiv 1909.11556, Sep. 2019, 15 pages.
Frankle et al., "The Lottery Ticket Hypothesis: Finding Sparse, Trainable Neural Networks", arXiv 1803.03635, ICLR, Mar. 2019, 42 pages.
Gale et al., "The State of Sparsity in Deep Neural Networks", arXiv 1902.09574, ICLR, Feb. 2019, 15 pages.
Ganesh et al., "Compressing Large-Scale Transformer-Based Models: A Case Study on BERT", arXiv 2002.11985, Feb. 2020, 7 pages.
Gordon et al., "Compressing BERT: Studying the Effects of Weight Pruning on Transfer Learning", arXiv, 2002.08307, May 2020, 15 pages.
Guo et al., "Reweighted Proximal Pruning for Large-Scale Language Representation", arXiv 1909.12486, Dec. 2019, 20 pages.
Han et al., "Learning both Weights and Connections for Efficient Neural Networks", arXiv 1506.02626, NeurIPS, Oct. 2015, p. 1135-1143.
Hinton et al., "Distilling the Knowledge in a Neural Network", arXiv 1503.02531, Mar. 2015, 9 pages.
Jiao et al., "TinyBERT: Distilling BERT for Natural Language Understanding", arXiv 1909.10351, Oct. 2020, 12 pages.
Mccarley et al., "Structured Pruning of a BERT-based Question Answering Model", arXiv 1910.06360, Apr. 2020, 10 pages.
Michel et al., "Are Sixteen Heads Really Better than One?" arXiv 1905.10650, NeurIPS, Nov. 2019, pp. 14014-14024.
Peters et al., "Deep contextualization word representations", arXiv 1802.05365, NAACL, Mar. 2018, pp. 2227-2237.
Rajpurkar et al., "SQuAD: 100,000+ Questions for Machine Comprehension of Text", arXiv 1606.05250, EMNLP Austin, TX, 2016, pp. 2383-2392.
Rajpurkar et al., "Know What you Don't Know: Unanswerable Questions for SQuAD", arXiv 1806.03822, ACL 2018, pp. 784-789.
Renda et al., "Comparing Rewinding and Fine-Tuning in Neural Network Pruning", arXiv 2003.02389, ICLR 2020, 31 pages, 2020.
Sanh et al., "DistilBERT, a distilled version of BERT: smaller, faster, cheaper and lighter", arXiv 1910.01108, NeurIPS EMC2 Workshop, Mar. 2020, 5 pages.
Strubell et al., "Energy and Policy Considerations for Deep Learning in NLP", arXiv 1906.02243, ACL, Florence, Italy, pp. 3645-3650.
Sun et al., "Patient Knowledge Distillation for BERT Model Compression", arXiv 1908.09355, EMNLP, Hong Kong, pp. 4323-4332, 2019.
Voita et al., "Analyzing Multi-Head Self-Attention: Specialized Heads Do the Heavy Lifting, the Rest Can be Pruned", arXiv 1905.09418, Jun. 2019, 12 pages.
Wang et al., "Glue: A Multi-Task Benchmark and Analysis Platform for Natural Language Understanding", arXiv 1804.07461, ICLR 2019, Feb. 2019, 20 pages.
Wang et al., "Structured Pruning of Large Language Models", arXiv 1910.04732, Oct. 2019, 10 pages.
Wang et al., "MiniLM: Deep Self-Attention Distillation for Task-Agnostic Compression of Pre-Trained Transformers", arXiv 2002.10957, Apr. 2020, 15 pages.
Xu et al., "BERT-of-Theseus: Compressing BERT by Progressive Module Replacing", arXiv 2002.02925, Oct. 2002, 11 pages.
Zhafrir et al., "Q8BERT: Quantized 8Bit BERT", arXiv 1910.06188, Oct. 2019, 5 pages.
Zhu et al., "To prune, or not to prune: exploring the efficacy of pruning for model compression", arXiv 1710.01878, Nov. 2017, 11 pages.

* cited by examiner

SYSTEM AND METHOD FOR KNOWLEDGE-PRESERVING NEURAL NETWORK PRUNING

TECHNICAL FIELD

This application generally relates to systems and methods for neural network pruning and, in particular, to systems and methods for knowledge-preserving neural network pruning.

BACKGROUND

Machine learning (ML) has been highly popular in data-intensive applications but is often hindered when the training data for a specific application is small. When accruing enough training data to train ML models for new application domains is unrealistic or difficult to achieve, existing solutions may use an ML model trained based on general-purpose training data collected from a large number of prior/similar application domains (also called general domains) and later fine-tune such ML model based on the limited domain-specific training data. The fine-tuned ML model may perform well in the new application domain because it possesses not only the specific application domain but also the knowledge learned from other related domains.

However, the fine-tuned ML is usually dense and large in size. When deploying the fine-tuned ML model like a neural network to a new domain, the computing devices therein may have limited computing capabilities and storage resources and thus may be unable to host the full-size fine-tuned neural network. Several existing neural network pruning techniques may effectively reduce the size of a neural network. However, directly applying these techniques may destroy the knowledge learned by the fine-tuned neural network. To address this dilemma between knowledge-preservation and network pruning, this present application describes a knowledge-preserving neural network pruning process.

SUMMARY

Various embodiments of the specification include, but are not limited to, systems, methods, and non-transitory computer-readable media for knowledge-preserving neural network pruning.

According to some embodiments, a computer-implemented method for knowledge-preserving neural network pruning may include: obtaining a pre-trained machine learning model trained based on a plurality of general-purpose training data; training a task-specific machine learning model by tuning the pre-trained machine learning model based on a plurality of task-specific training data corresponding to a task; constructing a student network based on the task-specific machine learning model; simultaneously performing (1) knowledge distillation from the trained task-specific machine learning model as a teacher network to the student network and (2) network pruning on the student network; and obtaining the trained student network for serving the task.

In some embodiments, the performing knowledge distillation comprises: selecting one or more layers of the teacher network; feeding the plurality of task-specific training data into the student network and the teacher network; and adjusting parameters of the student network to minimize a difference between an output of the student network and an output of the one or more layers of the teacher network in response to the plurality of task-specific training data.

In some embodiments, the pre-trained machine learning model is a pre-trained natural language neural network.

In some embodiments, the performing knowledge distillation comprises: constructing a distillation loss function for training the student network based on the teacher network, wherein the distillation loss function comprises a plurality of loss functions corresponding to one or more layers of the teacher network.

In some embodiments, the one or more layers of the teacher network comprise: an embedding layer; a self-attention layer; a feedforward layer; and an output layer.

In some embodiments, the plurality of loss functions comprise at least one of the following: a loss function based on a mean-square error of a difference between one or more embedding layers of the student network and the teacher network; a loss function based on a mean-square error of a difference between attention matrices of one or more layers of the student network and the teacher network; a loss function based on a mean-square error of a difference between hidden representations of one or more layers of the student network and the teacher network; or a soft cross-entropy loss between the teacher network and logits of the student network.

In some embodiments, the performing network pruning on the student network comprises: reducing a number of activated neurons in one or more layers of the student network by setting corresponding parameters as zeros.

In some embodiments, the teacher network and the student network share a same neural network architecture.

In some embodiments, the pre-trained machine learning model is a pre-trained residual network for computer vision tasks.

In some embodiments, the performing knowledge distillation comprises: constructing a distillation loss function for training the student network based on the teacher network, wherein the distillation loss function comprises a plurality of loss functions corresponding to one or more layers of the teacher network, and the one or more layers of the teacher network comprise: a weight layer; and an output layer.

In some embodiments, the constructing a student network based on the task-specific machine learning model comprises: initializing the student network by copying the task-specific machine learning model.

According to other embodiments, a system for knowledge-preserving neural network pruning includes one or more processors and one or more computer-readable memories coupled to the one or more processors and having instructions stored thereon that are executable by the one or more processors to perform operations comprising: obtaining a pre-trained machine learning model trained based on a plurality of general-purpose training data; training a task-specific machine learning model by tuning the pre-trained machine learning model based on a plurality of task-specific training data corresponding to a task; constructing a student network based on the task-specific machine learning model; simultaneously performing (1) knowledge distillation from the trained task-specific machine learning model as a teacher network to the student network and (2) network pruning on the student network; and obtaining the trained student network for serving the task.

According to yet other embodiments, a non-transitory computer-readable storage medium for knowledge-preserving neural network pruning is configured with instructions executable by one or more processors to cause the one or more processors to perform operations comprising: obtaining a pre-trained machine learning model trained based on a plurality of general-purpose training data; training a task-specific machine learning model by tuning the pre-trained machine learning model based on a plurality of task-specific training data corresponding to a task; constructing a student network based on the task-specific machine learning model; simultaneously performing (1) knowledge distillation from the trained task-specific machine learning model as a teacher network to the student network and (2) network pruning on the student network; and obtaining the trained student network for serving the task.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Figure 1:
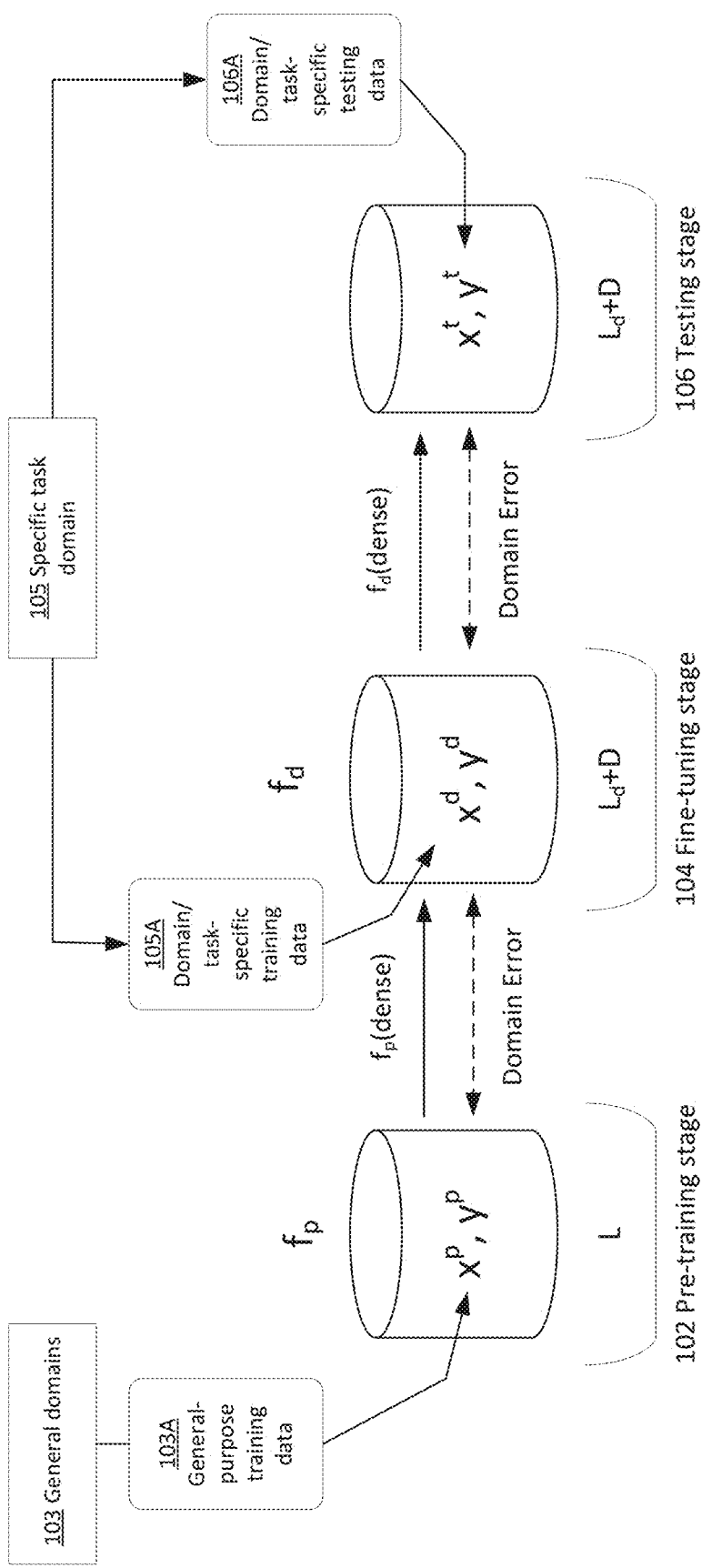
FIG. 1 illustrates an exemplary process of training a domain-specific neural network based on a pre-trained neural network in accordance with some embodiments.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

Existing deep learning models generally perform poorly in specific domains for various reasons. One reason is that the models are trained based on training datasets that are not collected from the specific domains, or the training datasets do not have sufficient data samples collected from the specific domains. As a result, neural networks trained using indoor images cannot detect objects in outdoor images well, and neural networks trained using data in one spatial/temporal domain cannot perform well in another spatial/temporal domain. This issue is hard to solve in practice for at least three reasons. First, a huge amount of training data need to be collected from the specific domains, which often is impractical. For example, a newly created domain monitored by a newly installed camera may not have sufficient historical data to train a model specifically for this newly created domain. Second, for supervised learning, the collected training data need to be properly labeled. Labeling a large volume of data is costly and inefficient. Third, it may take significant effort to update the model based on online data. In many use cases, the generation rate of online data is not high enough to support online training and updating of the model.

To address the above problems, a machine learning model may be first trained based on general-purpose training data, and then fine-tuned using the limited training data collected from a task-specific domain. Such a fine-tuned model may possess both the knowledge learned from the general-purpose domains and the task-specific domain. The knowledge learned from the task-specific domain may allow the fine-tuned model to make accurate predictions, while the knowledge learned from the general-purpose domains may allow the fine-tuned model to be flexible and robust.

However, in practical applications, these models are usually bulky in size and require expensive computation resources for training and inferencing. In some embodiments, the "heavy-weight" nature of these models makes them inefficient or impractical to be deployed into specific domains. For example, these models need to be hosted on powerful servers (e.g., a cloud server or a data center) rather than being deployed on edge devices such as smart devices, IoT, security cameras, personal computers, etc. It means the data collected in the domains need to be transmitted to the server to perform the expensive computations for inferencing. Sometimes, the inferencing results need to be transmitted back to the edge devices to show to the users. The data transmitting cost may be critical to various applications. As such, it is more desirable to have a "light-weight" model that is not only small in size (meaning less storage footprint and cheaper computational cost) but also can produce accurate results (predictions, classification, etc.) in the specific domains.

To reduce the size of a machine learning model such as neural networks, sparsification techniques (also called network pruning) are widely researched and experimented with. However, directly pruning the fine-tuned models may destroy the knowledge learned from the training process, which may lead to inaccurate model outputs. In this application, a knowledge-preserving neural network pruning process is described. This process may apply to various types of neural networks in different use cases. For illustrative purposes, neural network models for natural language processing (NLP) are used as examples to demonstrate how the knowledge-preserving neural network pruning works. A person in the art may easily adjust the configurations or structures to apply such a process to other use cases.

FIG. 1 illustrates an exemplary process of training a domain-specific neural network based on a pre-trained neural network in accordance with some embodiments. The components and stages in FIG. 1 are for illustrative purposes. The process may include more, fewer, or alternative components or stages depending on the implementation.

As shown in FIG. 1, the training process may include a pre-training stage 102, a fine-tuning stage 104, and a testing stage 106. In some embodiments, during the pre-training stage 102, a pre-trained model denoted as $f_p$ (p stands for pre-trained), such as a neural network, may be trained based on general-purpose training data 103A collected from a plurality of general-purpose domains 103. The term "domain" refers to a task or a use case from which historical data are collected, which may be used for training a machine learning model. The concept of general-purpose domains 103 is relative to the concept of specific task domain 105. The "specific task domain" 105 refers to a specific task or a specific use case in which a trained machine learning model will serve, and the "general-purpose domains" 103 refers to other tasks that are remotely or closely related to the specific task or the specific use case. The domain-specific training data 105A and the general-purpose training data 103A are the training data respectively collected from the specific task domain 105 and the general-purpose domains 103.

The output of the pre-training stage 102 may include a trained and dense neural network, denoted as $f_p$(dense). In some embodiments, the general-purpose training data 103A may provide a large volume of labeled training data denoted as $x^p$ and corresponding labels $y^p$. The model $f_p$ may be trained using supervised-learning algorithms based on the $x^p$, $y^p$. In other embodiments, the general-purpose training data 103A may also include a large volume of unlabeled training data. Here, the model $f_p$ may be trained using unsupervised-learning algorithms. In yet other embodiments, the general-purpose training data 103A may go through various pre-processing to generate sufficient labeled training data $x^p$, $y^p$, such as using a generative adversarial network (GAN) to generate synthetic labeled training data.

During the pre-training stage 102, general-purpose knowledge denoted as L may be learned based on the general-purpose training data 103A $x^p$, $y^p$. L may include a subset of knowledge particularly relevant to the specific task domain 105 in FIG. 1, which may be denoted as $L_d$.

In some embodiments, the general-purpose knowledge L, especially $L_d$ therein, may be transferred during the fine-tuning stage 104 into a domain-specific model denoted as $f_d$ (d stands for domain-specific or downstream). For example, the pre-trained model $f_p$(dense) may be used to initialize the domain-specific model $f_d$, which may be fine-tuned based on at least one of the following types of domain-specific knowledge: (1) $L_d$ encoded in the initialization of $f_d$, and (2) domain-specific knowledge, denoted as D, learned from the domain-specific training data 105A collected from the specific task domain 105. For example, in the world of natural language processing (NLP), the specific task domain 105 may refer to an NLP application in a specific context such as drafting sci-fi literature. The domain-specific knowledge D may be learned from existing works of sci-fi literature. In contrast, the general domains 103 may refer to NLP applications in various contexts such as drafting fiction, nonfiction, drama, poetry, and other literary genres. Thus the general-purpose knowledge L may include a subset $L_d$ collected from works of literature in the fiction genre that is closely related to the specific task domain 105 (in comparison to other genres, the fiction genre is the most closely related to sci-fi literature). In some embodiments, during the fine-tuning stage 104, the parameters of the $f_d$ may be fine-tuned to minimize domain errors based on the domain-specific training data 105A.

After the fine-tuning stage 104, a fine-tuned and dense neural network denoted as $f_d$(dense) may be generated. In some embodiments, $f_d$(dense) may go through the testing stage 106 for quality management. A set of domain-specific testing data 106A may be collected from the specific task domain 105. The domain-specific testing data 106A may include a plurality of labeled testing data denoted as $x^t$, $y^t$, where $x^t$ refers to data entries and $y^t$ refers to corresponding labels. In some embodiments, the testing stage 106 and the fine-tuning stage 104 may be designed as an iterative process. For example, $f_d$(dense) may go through a fine-tuning stage 104 first, followed by a testing state 106; if the testing results show that domain errors are above a threshold, $f_d$(dense) may go through another round of fine-tuning stage 104. Different fine-tuning stages 104 may use different domain-specific training data 105A.

One or more of the above stages may be performed by (or obtained from) a same entity or different entities. For example, the pre-training stage 102 may be implemented by a first entity, and the fine-tuning stage 104 may be implemented by a second entity. Similarly, the testing stage 106 may be implemented by either the second entity or a third entity. In some embodiments, all three stages may be implemented by one entity. Here, the "entity" may refer to a computer system, a cloud service, a platform, an organization, a cluster of computing devices, or another suitable entity. The communication channels (such as 111) among the exemplary stages and inputs/outputs may be over a wired connection, the internet, through a local network (e.g., LAN), or through direct communication (e.g., BLUETOOTH™, radio frequency, infrared).

Figure 2:
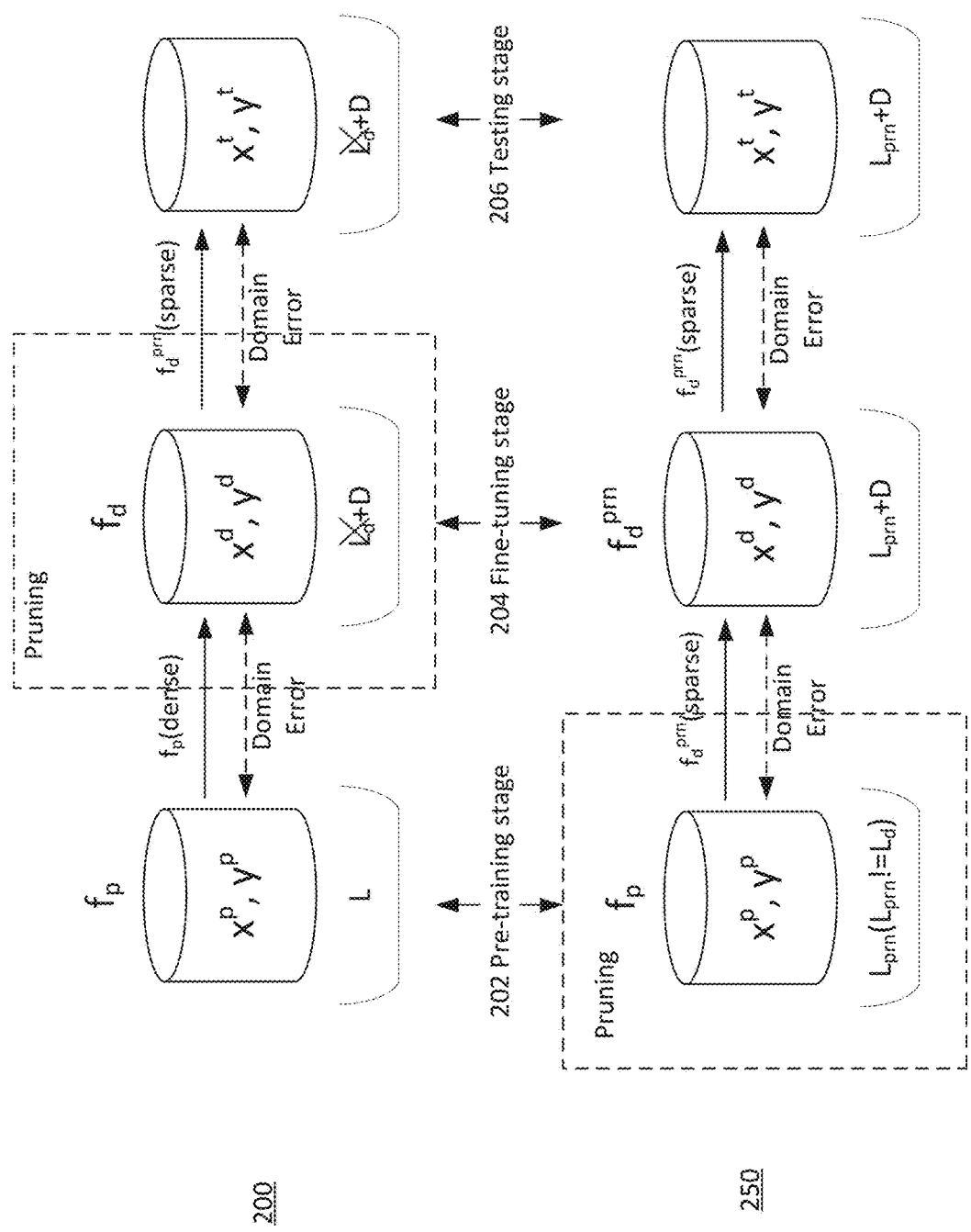
FIG. 2 illustrates exemplary diagrams of knowledge-transfer between neural networks with neural network pruning in accordance with some embodiments.

FIG. 2 illustrates exemplary diagrams of knowledge-transfer between neural networks with neural network pruning in accordance with some embodiments. As explained above, dense neural networks are often unsuitable for deployment into specific task domains due to resource constraints. For example, edge devices may have limited computing and storage resources to host a dense neural network with a large number of parameters. As a result, a dense neural network may be sparsified/pruned to reduce its size before deployment. For simplicity and consistency, FIG. 2 follows the workflow described in FIG. 1 and illustrates two options 200 and 250 for pruning a dense neural network at different stages in the workflow.

Option 200: after obtaining the dense neural network $f_p$(dense) trained based on general-purpose training data $x^p$, $y^p$, $f_p$(dense) may be fine-tuned and pruned simultaneously during the fine-tuning stage 204 to generate a fine-tuned neural network denoted as $f_d$. $f_p$(dense) may possess knowledge L learned from the general-purpose training data, which may include a subset knowledge $L_d$ that is related to a specific task. During the fine-tuning of $f_p$(dense), additional task-specific knowledge D may be learned from the task-specific training data $x^d$, $y^d$. Ideally, the process of fine-tuning of $f_p$(dense) may include both learning the task-specific knowledge D and preserving the knowledge $L_d$, because knowledge D may improve the accuracy of the neural network and knowledge $L_d$ may provide flexibility and robustness to the neural network. For example, in the context of NLP, the task-specific knowledge D may accurately predict a next word that follows a sequence of preceding words, and the knowledge $L_d$ may provide one or more synonyms of the next word. However, because the loss function to update the parameters of $f_d$ during the fine-tuning stage 204 may be solely based on the task-specific training data $x^d$, $y^d$ but not the general-purpose training data $x^p$, $y^p$, pruning $f_d$ at the fine-tuning stage 204 may destroy the knowledge $L_d$ learned from the general-purpose training data $x^p$, $y^p$. As a result, the pruned neural network output from the fine-tuning stage 204, denoted as $f_d^{prn}$(sparse), may be a sparse neural network with the task-specific knowledge D but destructed knowledge $L_d$.

Option 250: the pruning is performed during the pre-training stage 202. That is, the neural network $f_p$ is pruned and trained simultaneously based on general-purpose training data $x^p$, $y^p$. The output of the pre-training stage 202 may include a pruned neural network denoted as $f_d^{prn}$(sparse). The knowledge learned by the neural network $f_d^{prn}$(sparse) during this pre-training stage 202 may be denoted as $L_{prn}$. However, because the training and pruning during the pre-training stage 202 both ignore the downstream task information and the amount of general-purpose knowledge L is extremely large, i.e., $L \gg L_{prn}$ and $L \gg L_d$, the knowledge $L_{prn}$ learned by $f_d^{prn}$(sparse) may be very different from $L_d$ that should have been learned and preserved. This will cause a loss of knowledge $L_d$ that may not be recovered in the fine-tuning stage 204.

To address the technical disadvantages of the options 200 and 250 illustrated in FIG. 2, a knowledge-preserving neural network pruning process is described below.

Figure 3:
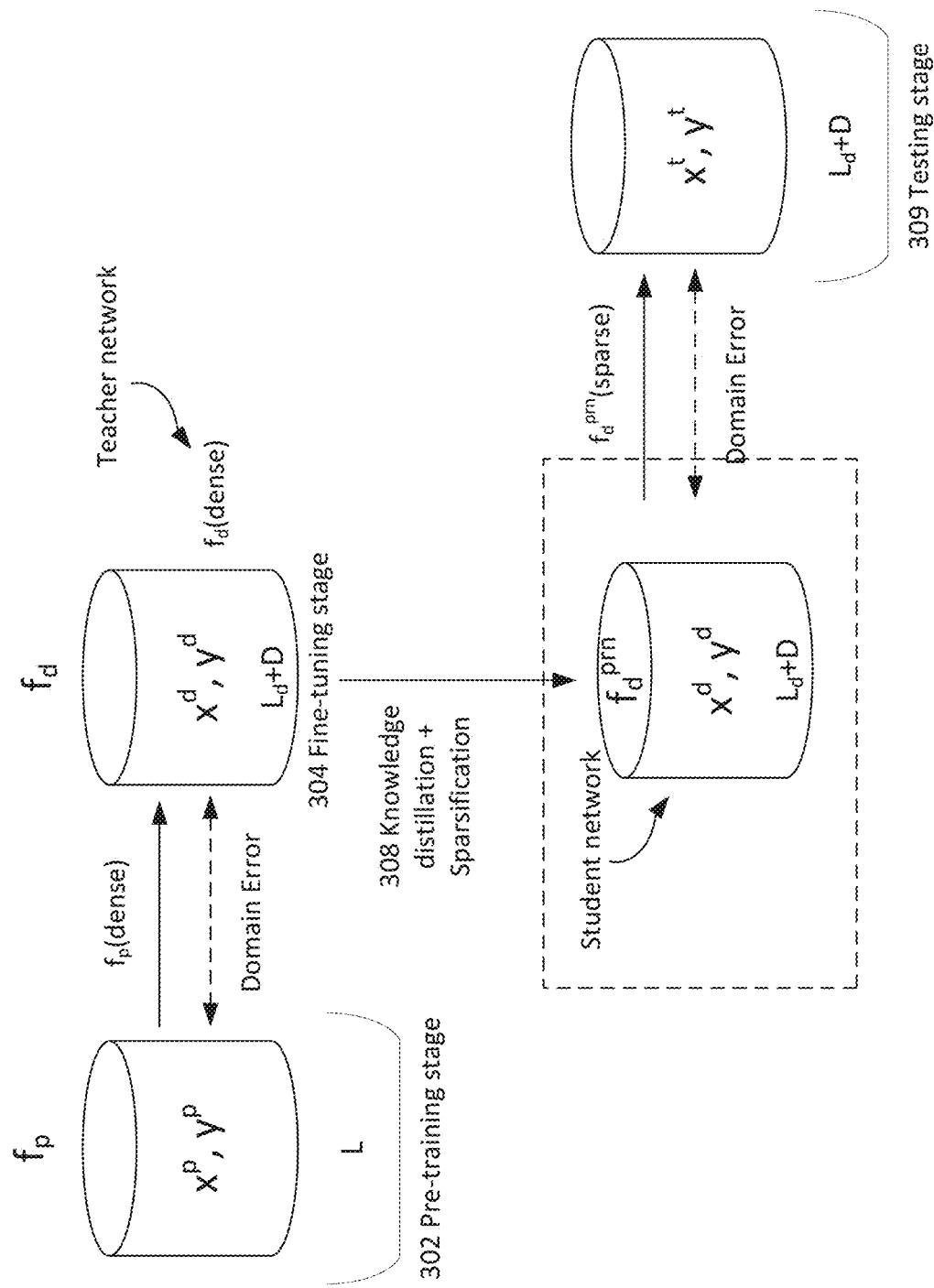
FIG. 3 illustrates an exemplary diagram of knowledge-preserving neural network pruning, in accordance with some embodiments.

FIG. 3 illustrates an exemplary diagram of knowledge-preserving neural network pruning, in accordance with some embodiments. The components and workflow in the diagram of FIG. 3 are merely illustrative and may be reconfigured depending on the implementation.

As described in FIG. 2, in the use cases involving pre-training a neural network based on general-purpose training data and then fine-tuning the pre-trained neural network based on domain-specific training data, there is a dilemma between preserving the domain-related knowledge learned from the general-purpose training data and pruning the neural network. In some embodiments, to address this dilemma, a knowledge-preserving neural network pruning process may be implemented by: obtaining a pre-trained neural network $f_p$ trained based on a plurality of general-purpose training data $x^p$, $y^p$; training a task-specific neural network $f_d$ by finetuning the pre-trained neural network $f_p$ based on a plurality of task-specific training data $x^d$, $y^d$ corresponding to a specific task (also called a specific domain); constructing a student network based on the task-specific neural network; simultaneously performing (1) knowledge distillation from the trained task-specific neural network $f_d$ as a teacher network to the student network and (2) network pruning on the student network; and obtaining the trained student network $f_d^{prn}$ for serving the task. Here, the neural network is an example, which may be replaced by any other machine learning models that can be pruned or otherwise sparsified.

For example, the neural network $f_p$ may be pre-trained based on the plurality of general-purpose training data $x^p$, $y^p$ during a pre-training stage 302. The output of the pre-training stage 302 may include a trained dense neural network $f_p$(dense). The knowledge possessed by $f_p$(dense) is learned from the general-purpose training data $x^p$, $y^p$. This knowledge, denoted as L, may include knowledge $L_d$ (i.e., $L_d \subset L$) related to the specific task. Subsequently, the dense neural network $f_p$(dense) may be fine-tuned based on the task-specific training data $x^d$, $y^d$ during a fine-tuning stage 304. The output of the fine-tuning stage 304 may include a second trained dense neural network denoted as $f_d$(dense). The knowledge learned by $f_d$(dense), denoted as D, is directly from the task-specific training data $x^d$, $y^d$ during the fine-tuning stage 304. Because the knowledge D embedded in the task-specific training data $x^d$, $y^d$ are inherently consistent with the knowledge $L_d$, the fine-tuning process will not disturb the learned knowledge $L_d$. As a result, the fine-tuned neural network $f_d$(dense) possesses the knowledge $L_d$ and knowledge D, as well as other knowledge in L but not closely related to the task.

To illustrate the difference between the different knowledge L, $L_d$, and D, an NLP example is described as follow: the general-purpose training data $x^p$, $y^p$ may be collected from existing literature of various genres, including drama, fable, folklore, nonfiction, fiction, etc., the task is to write a new sci-fi literature, and the task-specific training data $x^d$, $y^d$ may be collected from existing works of sci-fi literature. A subset of the training data $x^p$, $y^p$ may be related to fictional literature, which is closely related to sci-fi literature, i.e., the task. With the above assumptions, the knowledge L may refer to the knowledge learned from the existing literature of various genres, the knowledge $L_d$ may refer to a subset of L learned from the existing fictional literature, and the knowledge D may refer to the knowledge learned from the exiting words of sci-fi literature.

In some embodiments, the fine-tuned neural network $f_d$(dense) may be treated as a teacher network and used as a basis to construct a student network. In some embodiments, the student network and the teacher network may share the same neural network structure. For example, the student network may be constructed as a copy of the fine-tuned neural network $f_d$(dense). In other embodiments, the student network may have a different neural network structure than the teacher network. For example, the student network may have a fewer number of channels and/or layers.

In order to generate a pruned neural network that preserves the knowledge $L_d$ and D of the teacher network, a hybrid training process 308 may be performed against the student network. The hybrid training process 308 may include simultaneously performing (1) knowledge distillation from the teacher network to the student network and (2) network pruning on the student network based on the task-specific training data $x^d$, $y^d$. The knowledge distillation may transfer the knowledge $L_d$ and D from the teacher network to the student network, and the network pruning on the student network may effectively reduce the size of the student network. After the training process 308, the resultant student network, denoted as $f_d^{prn}$(sparse), may be both sparsified (pruned) and knowledgeable (with knowledge $L_d$ and D transferred from the teacher network).

Here, the term "knowledge distillation" refers to a technique in machine learning for transferring knowledge from a large model to a smaller one. While large models (such as deep neural networks or ensembles of many models) have higher knowledge capacity than small models, this capacity might not be fully utilized. Knowledge distillation may transfer knowledge from a large model to a smaller model without loss of validity. As smaller models are less expensive to train and test, they can be deployed on less powerful hardware (such as a mobile device). The "knowledge" may refer to the latent relationship learned by a machine learning model during a training process, and/or the ability to generate accurate outputs (e.g., predictions or classifications). For knowledge distillation between neural networks, the large neural network (source network) may be referred to as a teacher network, and the small neural network (network being trained) may be referred to as a student network.

In some embodiments, the knowledge distillation operations may include: selecting one or more layers of the teacher network; feeding the plurality of task-specific training data into the student network and the teacher network; and adjusting parameters of the student network to minimize a difference between an output of the student network and an output of the one or more layers of the teacher network in response to the plurality of task-specific training data.

In some embodiments, a distillation loss function may be defined to quantify the "difference between the output of the student network and the output of the one or more layers of the teacher network." For example, the distillation loss function may include a plurality of loss functions corresponding to one or more layers of the teacher network. In some embodiments, the one or more layers of the teacher network may include: an embedding layer, a self-attention layer, a feedforward layer, an output layer, another layer, or any combination thereof. In some embodiments, the "one or more layers of the teach network" must include the output layer for knowledge distillation (i.e., knowledge distillation must be performed at the output layer).

In some embodiments, the plurality of loss functions may include at least one of: a loss function based on a mean-square error of a difference between one or more embedding layers of the student network and the teacher network; a loss function based on a mean-square error of a difference between attention matrices of one or more layers of the student network and the teacher network; a loss function based on a mean-square error of a difference between hidden representations of one or more layers of the student network and the teacher network; or a soft cross-entropy loss between the teacher network and logits of the student network. For example, the distillation loss function may be defined as $L_{distil} = L_{emb} + L_{att} + L_{hid} + L_{prd}$, where $L_{emb} = MSE(E^S, E^T)$ refers to the difference between the outputs of the embedding layers of the student network and the teacher network (MSE refers to mean-square error, E refers to embedding layers, S refers to "student," and T refers to "teacher"); $L_{att} = \Sigma MSE(A_i^S, A_i^T)$ refers to a difference between attention matrices of the student network and the teacher network (i is the layer index, A refers to attention matrices); $L_{hid} = \Sigma MSE(H_i^S, H_i^T)$ refers to the difference between hidden representations of the student network and the teacher network, and $L_{prd} = -softmax(z^T)*log\_softmax(z^S/temp)$ represents the soft cross-entropy loss between the logits of the student network and the teacher network (temp is the temperature parameter in the context of knowledge distillation, $z^T$ is the prediction logits of the teacher network, and $z^S$ is the prediction logits of the student network).

In some embodiments, the network pruning on the student network may include sparse pruning by deactivating the number of connections of the student network between the neurons of one layer to the neurons of the next layer by setting corresponding parameters as zeros. When a connection from a source neuron of one layer to a target neuron of the next layer is deactivated, the source neuron may be deemed as deactivated. There are various ways to deactivate a neuron, such as setting a parameter of the corresponding connection (from the neuron) to zero. Other network pruning techniques may also be applicable, such as reducing the number of channels and layers. For example, during each round of pruning, one or more neurons of the student network may be selected based on one or more associated weights or other parameters (i.e., neurons with weights/parameters indicating less impact on the output). These selected neurons may be deactivated (e.g., by setting the associated weights as 0s). One or more training data task-specific training data $x^d$ may then be fed into the dense teacher network and the sparsified student network to obtain predicted labels. These predicted labels and the labels in the training data $y^d$ may be fed into the one or more loss functions to determine the losses. Based on these losses (e.g., by backpropagating the gradients of the loss functions), one or more parameters of the student network may be adjusted to minimize the losses. This way, the student network may be gradually pruned and trained to approximate the teacher network. The pruned and trained student network may later be deployed the specific task.

Since the network pruning and knowledge distillation are performed simultaneously, the knowledge lost due to network pruning may be recovered by the knowledge distillation. As a result, the trained and pruned student network $f_d^{prn}$(sparse) may preserve the knowledge related to the task (knowledge $L_d$ and D), and trim off the knowledge in L that is not related to the task. It means, the pruned neurons (the neurons turned into inactive) are not related to the knowledge $L_d$ and D.

In some embodiments, the trained and pruned student network $f_d^{prn}$(sparse) may go through a testing stage 309 for quality management. The student network $f_d^{prn}$(sparse) will be tested against task-specific testing data $x^t$, $y^t$ collected from the task-specific domain. The observed domain errors may be used to qualify the trained and pruned student network $f_d^{prn}$ (sparse). The testing stage 206 and the fine-tuning stage 204 may be performed iteratively. For example, if the trained and pruned student network $f_d^{prn}$(sparse) from the fine-tuning stage 204 failed the qualification during the testing stage 206, the student network may go through another round of fine-tuning stage 204 with adjusted training data.

Figure 4A:
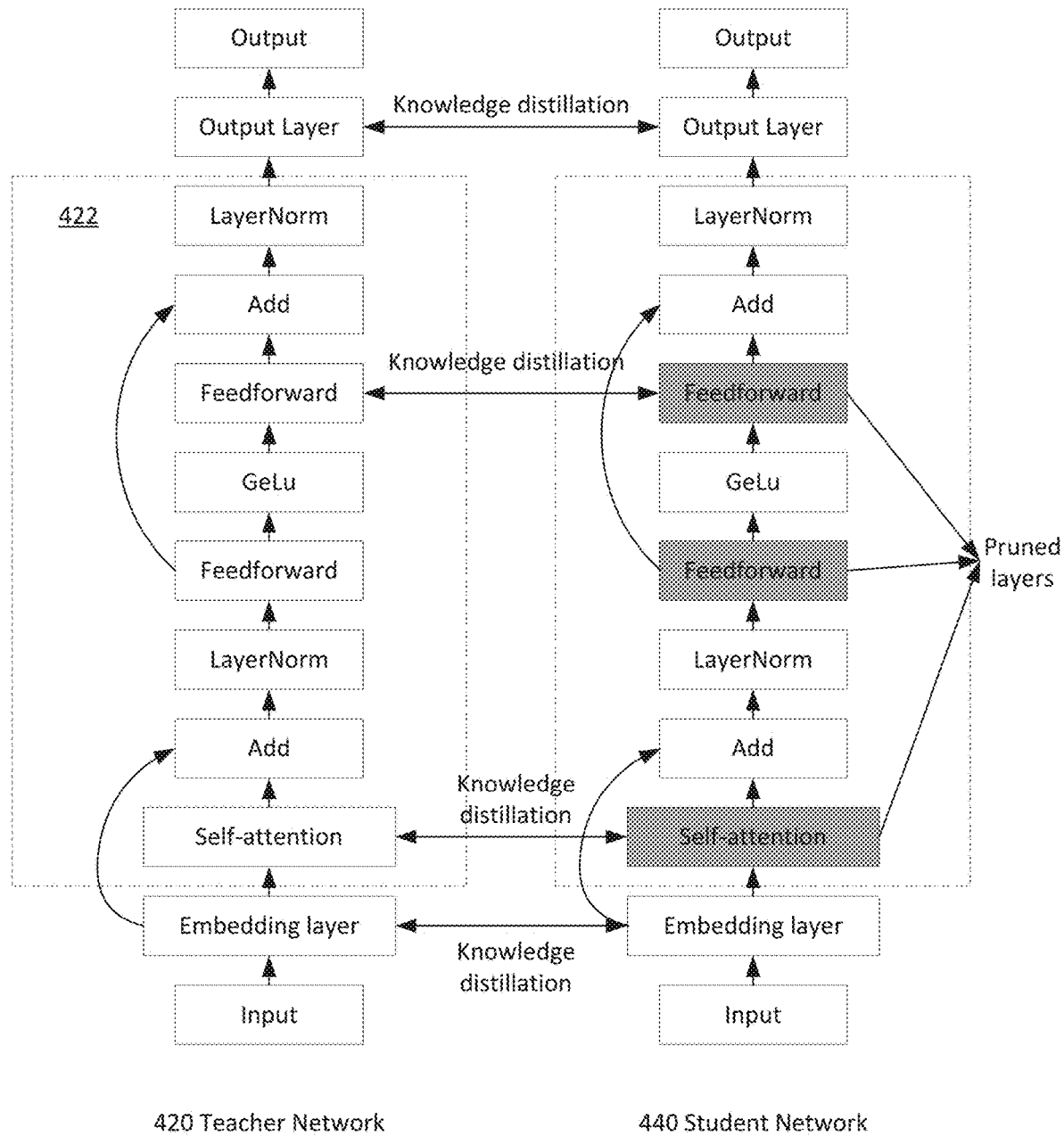
FIG. 4A illustrates a knowledge-preserving neural network pruning example in accordance with some embodiments.

FIG. 4A illustrates a knowledge-preserving neural network pruning example, in accordance with some embodiments. The neural networks 420 and 440 in FIG. 4A are for illustrative purposes, which may include fewer, more, or alternative layers and channels depending on the implementation.

In FIG. 4A, the teacher network 420 may refer to a fine-tuned neural network output from the fine-tuning stage 304 in FIG. 3. The teacher network is a dense (i.e., large) neural network possessing knowledge learned from a task-specific domain as well as knowledge learned from other domains that are related to the task-specific domain. For example, the task-specific domain may refer to drafting sci-fi literature, and the "other domains" may refer to drafting fictional literature. The knowledge may be transferred from the teacher network 420 to the student network 440 while the student network 440 being pruned.

In some embodiments, the teacher network 420 may include a block of layers 422 that repeats multiple times. That is, the teacher network 420 may include a plurality of consecutively connected blocks of layers like block 422. For example, assuming the teacher network 420 represents a fine-tuned BERT, it may include 12 of the block 422. For illustrative purposes, FIG. 4A only shows block 422 once. In some embodiments, the teacher network 420 may include an input layer, an embedding layer, one or more self-attention layers, one or more feedforward layers, one output layer, and other layers.

In some embodiments, the student network 440 may be initialized as a copy of the teacher network 420. That is, the two networks 420 and 440 have the same network structure. The knowledge distillation between the teacher network 420 and the student network 440 may be carried out against one or more layers of the two networks. As shown in FIG. 4A, the knowledge distillation may be performed at the outputs of four types of layers: the embedding layer (e.g., input feature extraction layer), the self-attention layer, the second feedforward layer, and the output layer. The knowledge distillation operations are aimed to minimize the difference between the outputs of the selected layers of the teacher network 420 and the student network 440. In some embodiments, the selection of the layers for knowledge distillation may be adjusted depending on the tasks. In some embodiments, the output layer may always participate in the knowledge distillation.

While the knowledge distillation of the selected layers is being performed between the teacher network 420 and the student network 440, neural network sparse pruning operations may be simultaneously performed against one or more layers of the student network 440. In the example shown in FIG. 4A, the self-attention layer and two feedforward layers of the student network 440 are being pruned. That is, the number of active neurons within these layers is being reduced.

Figure 4B:
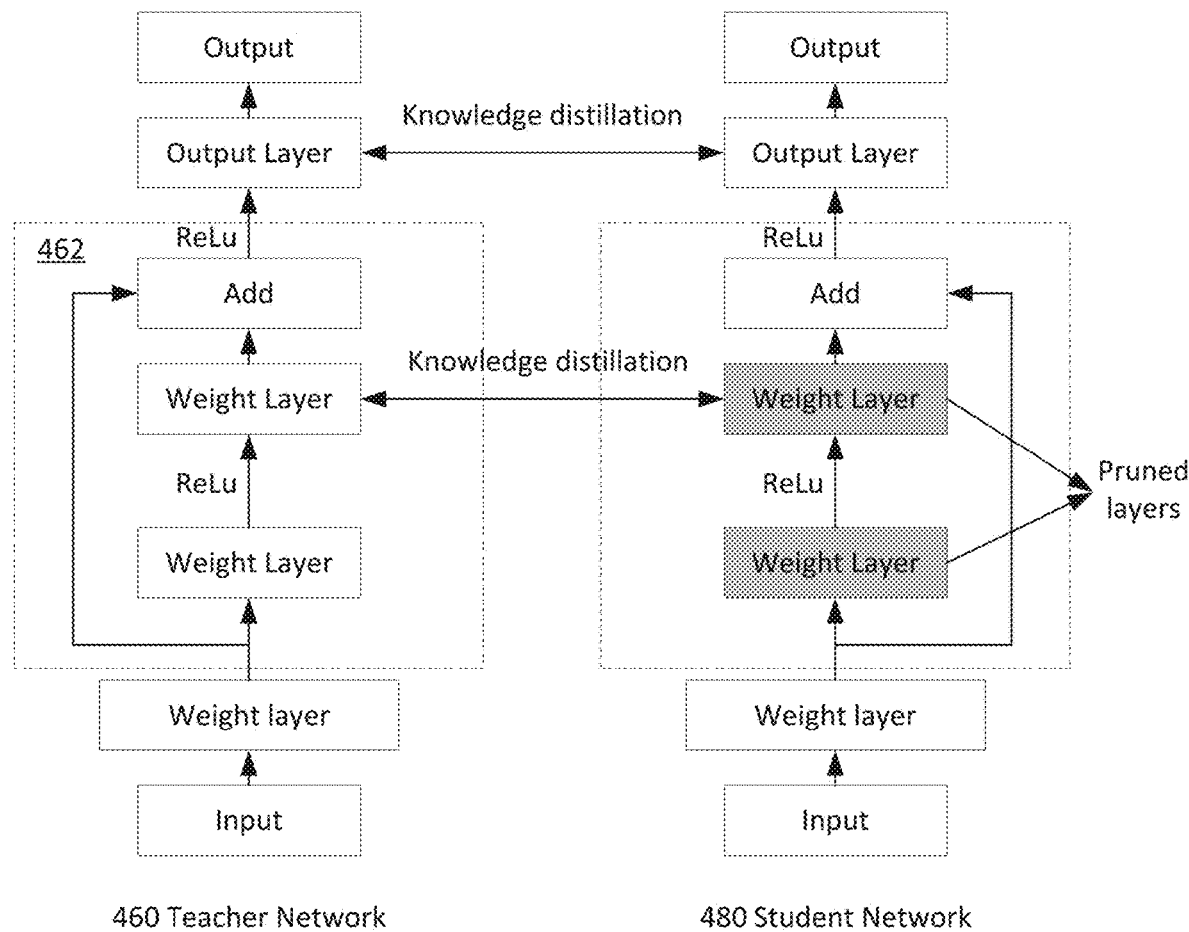
FIG. 4B illustrates another knowledge-preserving neural network pruning example in accordance with some embodiments.

FIG. 4B illustrates another knowledge-preserving neural network pruning example in accordance with some embodiments. The neural networks 460 and 480 in FIG. 4B are for illustrative purposes, which may include fewer, more, or alternative layers and channels depending on the implementation.

In FIG. 4B, The teacher network 460 may refer to a fine-tuned neural network output from the fine-tuning stage 304 in FIG. 3. The teacher network is a dense (i.e., large in size) neural network possessing knowledge learned from a task-specific domain as well as knowledge learned from other domains that are related to the task-specific domain. For example, the task-specific domain may refer to drafting sci-fi literature, and the "other domains" may refer to drafting fictional literature. The knowledge may be transferred from the teacher network 460 to the student network 480 while the student network 480 being pruned.

In some embodiments, the teacher network 460 may include a block of layers 462 that repeats multiple times. That is, the teacher network 460 may include a plurality of consecutively connected blocks of layers like block 462. For example, assuming the teacher network 460 represents a ResNet-50, it may include 24 of the block 462. For illustrative purposes, FIG. 4B only shows block 462 once. In some embodiments, the teacher network 460 may include one or more weight layers, one output layer, and other layers.

In some embodiments, the student network 480 may be initialized as a copy of the teacher network 460. That is, the two networks 460 and 480 have the same network structure. The knowledge distillation between the teacher network 460 and the student network 480 may be carried out against one or more layers of the two networks. As shown in FIG. 4B, the knowledge distillation may be performed at the outputs of two types of layers: one or more of the weight layers and the output layer. The knowledge distillation operations are aimed to minimize the difference between the outputs of the selected layers of the teacher network 460 and the student network 480. In some embodiments, the selection of the layers for knowledge distillation may be adjusted depending on the tasks. In some embodiments, the output layer may always participate in the knowledge distillation.

While the knowledge distillation of the selected layers is being performed between the teacher network 460 and the student network 480, neural network sparse pruning operations may be simultaneously performed against one or more layers of the student network 480. In the example shown in FIG. 4B, two weight layers of the student network 480 are being pruned. That is, the number of active neurons within these layers is being reduced.

Figure 5:
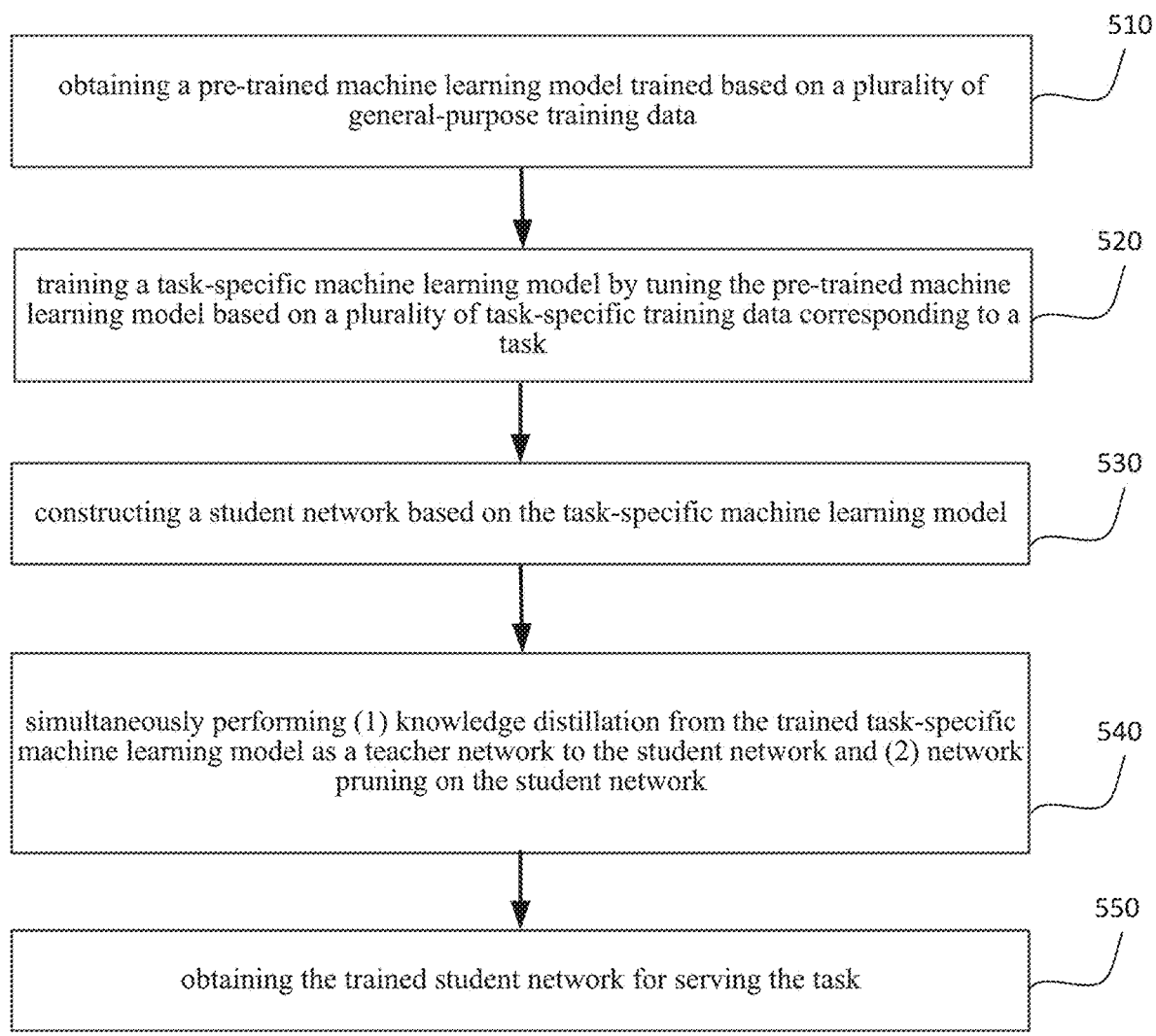
FIG. 5 illustrates an exemplary method for knowledge-preserving neural network pruning in accordance with some embodiments.

FIG. 5 illustrates an exemplary method 500 for fast object detection with bounding-box correction, in accordance with some embodiments. The method 500 may be implemented in a workflow shown in FIG. 3. The method 500 is for illustrative purposes and may include more, fewer, or alternative steps depending on the implementation and practical considerations.

Block 510 includes obtaining a pre-trained machine learning model trained based on a plurality of general-purpose training data. In some embodiments, the pre-trained machine learning model is a pre-trained natural language neural network.

Block 520 includes training a task-specific machine learning model by tuning the pre-trained machine learning model based on a plurality of task-specific training data corresponding to a task.

Block 530 includes constructing a student network based on the task-specific machine learning model. In some embodiments, the construction of a student network based on the task-specific machine learning model comprises: initializing the student network by copying the task-specific machine learning model.

Block 540 includes simultaneously performing (1) knowledge distillation from the trained task-specific machine learning model as a teacher network to the student network and (2) network pruning on the student network. In some embodiments, the performing knowledge distillation comprises: selecting one or more layers of the teacher network; feeding the plurality of task-specific training data into the student network and the teacher network; and adjusting parameters of the student network to minimize a difference between an output of the student network and an output of the one or more layers of the teacher network in response to the plurality of task-specific training data.

In some embodiments, the performing knowledge distillation comprises: constructing a distillation loss function for training the student network based on the teacher network, wherein the distillation loss function comprises a plurality of loss functions corresponding to one or more layers of the teacher network. In some embodiments, the one or more layers of the teacher network comprise: an embedding layer; a self-attention layer; a feedforward layer; and an output layer. In some embodiments, the plurality of loss functions comprise at least one of the following: a loss function based on a mean-square error of a difference between one or more embedding layers of the student network and the teacher network; a loss function based on a mean-square error of a difference between attention matrices of one or more layers of the student network and the teacher network; a loss function based on a mean-square error of a difference between hidden representations of one or more layers of the student network and the teacher network; or a soft cross-entropy loss between the teacher network and logits of the student network.

In some embodiments, the performing network pruning on the student network comprises: reducing a number of activated neurons in one or more layers of the student network by setting corresponding parameters as zeros. In some embodiments, the teacher network and the student network share a same neural network architecture.

In some embodiments, the pre-trained machine learning model is a pre-trained residual network for computer vision tasks. In some embodiments, the performing knowledge distillation comprises: constructing a distillation loss function for training the student network based on the teacher network, wherein the distillation loss function comprises a plurality of loss functions corresponding to one or more layers of the teacher network, and the one or more layers of the teacher network comprise: a weight layer; and an output layer.

Block 550 includes obtaining the trained student network for serving the task.

Figure 6:
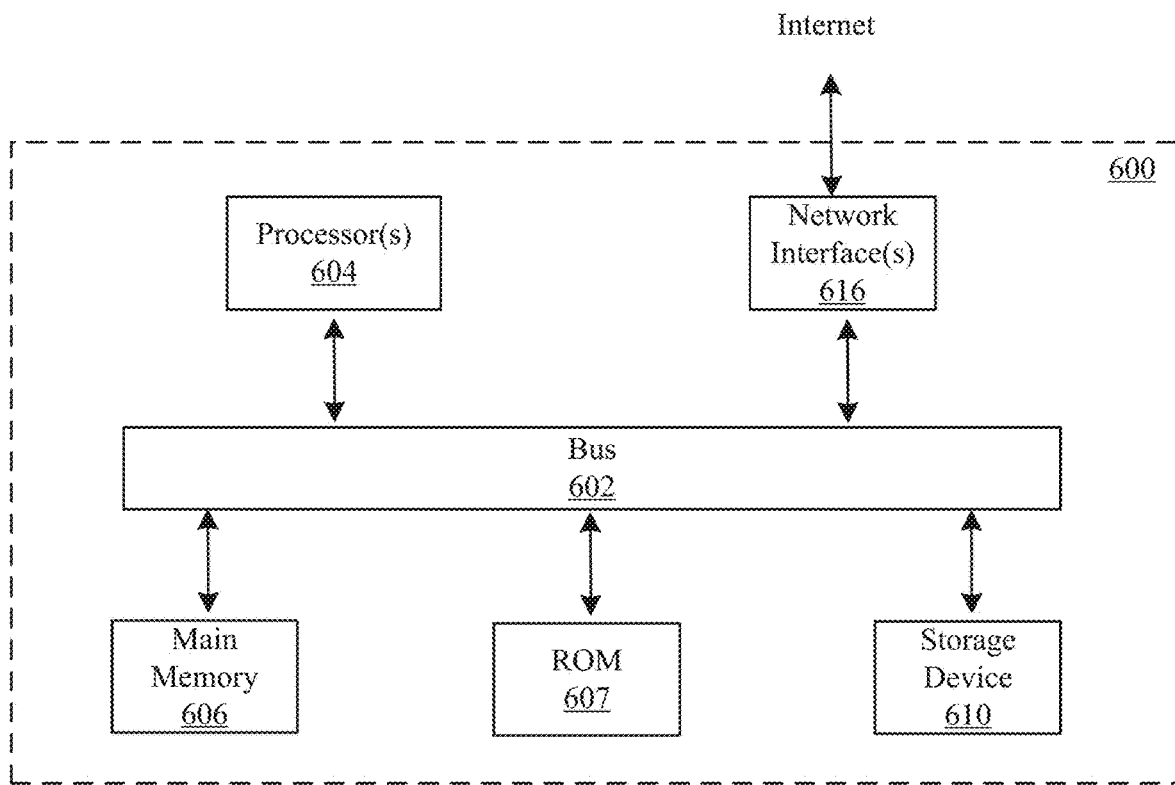
FIG. 6 illustrates a block diagram of a computer system in which any of the embodiments described herein may be implemented.

FIG. 6 illustrates a block diagram of a computer system 600 in which any of the embodiments described herein may be implemented. The computer system 600 may be implemented in any of the components of the environments or systems illustrated in FIGS. 1-5. One or more of the example methods illustrated by FIGS. 1-5 may be performed by one or more implementations of the computer system 600.

The computer system 600 may include a bus 602 or another communication mechanism for communicating information, one or more hardware processor(s) 604 coupled with bus 602 for processing information. Hardware processor(s) 604 may be, for example, one or more general-purpose microprocessors.

The computer system 600 may also include a main memory 606, such as a random-access memory (RAM), cache and/or other dynamic storage devices, coupled to bus 602 for storing information and instructions executable by processor(s) 604. Main memory 606 also may be used for storing temporary variables or other intermediate information during execution of instructions executable by processor(s) 604. Such instructions, when stored in storage media accessible to processor(s) 604, render computer system 600 into a special-purpose machine that is customized to perform the operations specified in the instructions. The computer system 600 may further include a read only memory (ROM) 608 or other static storage device coupled to bus 602 for storing static information and instructions for processor(s) 604. A storage device 610, such as a magnetic disk, optical disk, or USB thumb drive (Flash drive), etc., may be provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 may cause processor(s) 604 to perform the process steps described herein. In alternative embodiments, hard-wired circuitry may be used in place of or in combination with software instructions.

The main memory 606, the ROM 607, and/or the storage device 610 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 may include a network interface 618 coupled to bus 602. Network interface 618 may provide a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 may send and receive electrical, electromagnetic or optical signals that carry digital data streams representing various types of information.

The computer system 600 can send messages and receive data, including program code, through the network(s), network link and network interface 618. In the Internet example, a server might transmit a requested code for an application program through the Internet, the ISP, the local network and the network interface 618.

The received code may be executed by processor(s) 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A computer-implemented method, comprising:
    obtaining a pre-trained machine learning model trained based on a plurality of general-purpose training data;
    training a task-specific machine learning model by tuning the pre-trained machine learning model based on a plurality of task-specific training data corresponding to a task, wherein the trained task-specific machine learning model is a teacher network;
    constructing a student network based on the teacher network; and
    executing two or more rounds of fine-tuning of the student network, each round of fine-tuning comprising performing:
        network pruning on the student network, and
        knowledge distillation from the teacher network to the pruned student network based on a plurality of loss functions corresponding to one or more layers of the teacher network, wherein the one or more layers comprise an embedding layer of the teacher network.

2. The method of claim 1, wherein the performing knowledge distillation comprises:
    feeding the plurality of task-specific training data into the student network and the teacher network; and
    adjusting parameters of the student network to minimize a difference between an output of an embedding layer of the student network and an output of the embedding layer of the teacher network in response to the plurality of task-specific training data.

3. The method of claim 1, wherein the pre-trained machine learning model is a pre-trained natural language neural network.

4. The method of claim 1, wherein the performing knowledge distillation comprises:
    constructing the plurality of loss functions corresponding to the one or more layers of the teacher network using mean-square errors.

5. The method of claim 1, wherein the one or more layers of the teacher network of the teacher network comprise:
    a self-attention layer;
    a feedforward layer; and
    an output layer.

6. The method of claim 1, wherein the plurality of loss functions comprise at least one of:
    a loss function based on a mean-square error of a difference between outputs of the embedding layer of the teacher network and a corresponding embedding layer of the student network;
    a loss function based on a mean-square error of a difference between attention matrices of a layer of the teacher network and a corresponding layer of the student network;
    a loss function based on a mean-square error of a difference between hidden representations generated by the student network and the teacher network; or
    a soft cross-entropy loss between the teacher network and logits of the student network.

7. The method of claim 1, wherein the performing network pruning on the student network comprises:
    reducing a number of activated neurons of the student network by setting corresponding parameters as zeros.

8. The method of claim 1, wherein the teacher network and the student network share a same neural network architecture.

9. The method of claim 1, wherein the pre-trained machine learning model is a pre-trained residual network for computer vision tasks.

10. The method of claim 9, wherein the one or more layers of the teacher network comprise:
    a weight layer; and
    an output layer.

11. The method of claim 1, wherein the constructing a student network based on the teacher network comprises:
    initializing the student network by copying the task-specific machine learning model.

12. A system comprising one or more processors and one or more non-transitory computer-readable memories coupled to the one or more processors and configured with instructions executable by the one or more processors to cause the system to perform operations comprising:
    obtaining a pre-trained machine learning model trained based on a plurality of general-purpose training data;
    training a task-specific machine learning model by tuning the pre-trained machine learning model based on a plurality of task-specific training data corresponding to a task, wherein the trained task-specific machine learning model is a teacher network;
    constructing a student network based on the teacher network; and executing two or more rounds of fine-tuning of the student network, each round of fine-tuning comprising performing:
  network pruning on the student network, and
  knowledge distillation from the teacher network to the pruned student network based on a plurality of loss functions corresponding to one or more layers of the teacher network, wherein the one or more layers comprise an embedding layer of the teacher network.

13. The system of claim 12, wherein the performing knowledge distillation comprises:
  feeding the plurality of task-specific training data into the student network and the teacher network; and
  adjusting parameters of the student network to minimize a difference between an output of an embedding layer of the student network and an output of the embedding layer of the teacher network in response to the plurality of task-specific training data.

14. The system of claim 12, wherein the pre-trained machine learning model is a pre-trained natural language neural network, and the performing knowledge distillation comprises:
  constructing the plurality of loss functions corresponding to the one or more layers of the teacher network using mean-square errors.

15. The system of claim 12, wherein the performing network pruning on the student network comprises:
  reducing a number of activated neurons in the student network by setting corresponding parameters as zeros.

16. The system of claim 12, wherein the pre-trained machine learning model is a pre-trained residual network for computer vision tasks, and the one or more layers of the teacher network comprise:
  a weight layer; and
  an output layer.

17. A non-transitory computer-readable storage medium configured with instructions executable by one or more processors to cause the one or more processors to perform operations comprising:
  obtaining a pre-trained machine learning model trained based on a plurality of general-purpose training data;
  training a task-specific machine learning model by tuning the pre-trained machine learning model based on a plurality of task-specific training data corresponding to a task, wherein the trained task-specific machine learning model is a teacher network;
  constructing a student network based on the teacher network; and
  executing two or more rounds of fine-tuning of the student network, each round of fine-tuning comprising performing:
    network pruning on the student network, and
    knowledge distillation from the teacher network to the pruned student network based on a plurality of loss functions corresponding to one or more layers of the teacher network, wherein the one or more layers comprise an embedding layer of the teacher network.

18. The storage medium of claim 17, wherein the performing knowledge distillation comprises:
  feeding the plurality of task-specific training data into the student network and the teacher network; and
  adjusting parameters of the student network to minimize a difference between an output of an embedding layer of the student network and an output of the embedding layer of the teacher network in response to the plurality of task-specific training data.

19. The storage medium of claim 17, wherein the pre-trained machine learning model is a pre-trained natural language neural network, and the performing knowledge distillation comprises:
  constructing the plurality of loss functions corresponding to the one or more layers of the teacher network using mean-square errors.

20. The storage medium of claim 17, wherein the constructing a student network based on the teacher network comprises:
  initializing the student network by copying the task-specific machine learning model.

* * * * *